(12) United States Patent
Berry et al.

(10) Patent No.: US 7,882,322 B2
(45) Date of Patent: Feb. 1, 2011

(54) EARLY DIRECTORY ACCESS OF A DOUBLE DATA RATE ELASTIC INTERFACE

(75) Inventors: Christopher J. Berry, Hudson, NY (US); Jonathan Y. Chen, Marlboro, NY (US); Michael Fee, Cold Spring, NY (US); Patrick J. Meaney, Poughkeepsie, NY (US); Alan P. Wagstaff, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/426,675

(22) Filed: Jun. 27, 2006

(65) Prior Publication Data
US 2007/0300032 A1   Dec. 27, 2007

(51) Int. Cl.
G06F 12/00 (2006.01)
G06F 13/00 (2006.01)
G06F 13/28 (2006.01)

(52) U.S. Cl. .............................. 711/167; 711/E12.052
(58) Field of Classification Search ................. 711/167, 711/E12.052
See application file for complete search history.

(56) References Cited

U.S. PATENT DOCUMENTS

| | | | |
|---|---|---|---|
| 5,805,872 A | 9/1998 | Bannon | |
| 5,867,541 A | 2/1999 | Tanaka | |
| 5,971,889 A | 10/1999 | Ohashi et al. | |
| 6,114,886 A | 9/2000 | Seo | |
| 6,166,563 A | 12/2000 | Volk | |
| 6,170,506 B1 | 1/2001 | Butwin et al. | |
| 6,202,128 B1 * | 3/2001 | Chan et al. .................. | 711/131 |
| 6,238,436 B1 | 7/2001 | Hashimoto | |
| 6,263,463 B1 | 7/2001 | Hashimoto | |
| 6,279,073 B1 | 8/2001 | McCraken | |
| 6,282,128 B1 | 8/2001 | Lee | |
| 6,315,692 B1 | 11/2001 | Takahashi et al. | |
| 6,335,955 B1 | 1/2002 | Knots | |
| 6,373,289 B1 | 4/2002 | Martin | |
| 6,396,322 B1 | 5/2002 | Kim et al. | |
| 6,424,198 B1 | 7/2002 | Wolford | |
| 6,442,102 B1 | 8/2002 | Borkenhagen et al. | |
| 6,452,865 B1 | 9/2002 | Wolford | |

(Continued)

OTHER PUBLICATIONS

The PC Guide, "Cache Mapping and Associativity", Apr. 17, 2001, pp. 1-3, http://www.pcguide.com/ref/mbsys/cache/funcMapping-c.html.*

(Continued)

*Primary Examiner*—Matt Kim
*Assistant Examiner*—Christopher D Birkhimer
(74) *Attorney, Agent, or Firm*—Jon A. Gibbons; Fleit Gibbons Gutman Bongini & Bianco PL

(57) ABSTRACT

A system and method to organize and use data sent over a double data rate interface so that the system operation does not experience a time penalty. The first cycle of data is used independently of the second cycle so that latency is not jeopardized. There are many applications. In a preferred embodiment for an L2 cache, the system transmits congruence class data in the first half and can start to access the L2 cache directory with the congruence class data.

20 Claims, 8 Drawing Sheets

U.S. PATENT DOCUMENTS

| | | |
|---|---|---|
| 6,473,838 B1 | 10/2002 | Bass |
| 6,477,592 B1 | 11/2002 | Chen |
| 6,493,285 B1 | 12/2002 | Wolford |
| 6,510,503 B2 | 1/2003 | Gillingham |
| 6,560,669 B1 | 5/2003 | Ryan |
| 6,584,578 B1 | 6/2003 | Faue |
| 6,603,706 B1 | 8/2003 | Nystuen |
| 6,671,753 B2 | 12/2003 | Dreps et al. |
| 6,715,096 B2 | 3/2004 | Kuge |
| 6,760,856 B1 | 7/2004 | Borkenhagen |
| 6,826,113 B2 | 11/2004 | Ellis et al. |
| 6,832,294 B2 | 12/2004 | Wicki et al. |
| 6,838,712 B2 | 1/2005 | Stubbs |
| 6,874,097 B1 | 3/2005 | Aliahamd |
| 6,907,493 B2 | 6/2005 | Ryan |
| 6,912,628 B2 | 6/2005 | Wicki et al. |
| 6,914,829 B2 | 7/2005 | Lee |
| 6,920,576 B2 | 7/2005 | Ehmann |
| 7,017,067 B2 | 3/2006 | Zielbauer |
| 7,089,440 B2 | 8/2006 | Wu |
| 7,132,854 B1 | 11/2006 | Chen |
| 7,135,854 B2 | 11/2006 | Brain et al. |
| 7,138,844 B2 | 11/2006 | Lee |
| 7,225,354 B2 | 5/2007 | Tseng |
| 7,295,489 B2 | 11/2007 | Yoon |
| 7,376,021 B2 | 5/2008 | Heo |
| 7,412,618 B2 | 8/2008 | Ferraiolo |
| 7,440,531 B2 | 10/2008 | Dreps |
| 2001/0046163 A1 | 11/2001 | Yanagawa |
| 2002/0018395 A1 | 2/2002 | McLaury |
| 2002/0130795 A1 | 9/2002 | Moon |
| 2003/0001651 A1 | 1/2003 | Rosa |
| 2003/0043926 A1 | 3/2003 | Terashime |
| 2003/0065908 A1* | 4/2003 | Patel et al. .................. 712/214 |
| 2003/0085734 A1 | 5/2003 | Nguyen |
| 2003/0217214 A1 | 11/2003 | Calvignac |
| 2004/0071171 A1 | 4/2004 | Ghiasi |
| 2004/0089069 A1 | 5/2004 | Weber et al. |
| 2004/0098551 A1 | 5/2004 | Heo et al. |
| 2004/0117742 A1 | 6/2004 | Emberling et al. |
| 2004/0123173 A1 | 6/2004 | Emberling |
| 2004/0148538 A1 | 7/2004 | Li et al. |
| 2004/0174765 A1 | 9/2004 | Seo |
| 2004/0239288 A1 | 12/2004 | Harrison et al. |
| 2004/0260962 A1 | 12/2004 | Suen |
| 2005/0001655 A1 | 1/2005 | Takeda |
| 2005/0050289 A1 | 3/2005 | Raad |
| 2005/0105349 A1 | 5/2005 | Dahlberg |
| 2005/0114724 A1 | 5/2005 | Wu |
| 2005/0141331 A1 | 6/2005 | Che |
| 2005/0157827 A1 | 7/2005 | Yoon |
| 2005/0162187 A1 | 7/2005 | Nguyen |
| 2005/0174145 A1 | 8/2005 | Dosho |
| 2005/0195928 A1 | 9/2005 | Yamazaki |
| 2007/0300095 A1 | 12/2007 | Fee |
| 2007/0300098 A1 | 12/2007 | Chen |
| 2007/0300099 A1 | 12/2007 | Chen |

OTHER PUBLICATIONS

David A. Patterson and John L. Hennessy, "Computer Organization And Design: The Hardware/Software Interface", Third Edition, 2005, pp. 497 and 503.*

Microsoft, "Computer Dictionary", Fifth Edition, 2002, p. 306.*

Non-Final Office Action, Nov. 20, 2008, in U.S. Appl. No. 11/426,675.

Non-Final Office Action, Nov. 25, 2008, in U.S. Appl. No. 11/426,648.

Non-Final Office Action, Dec. 11, 2008, in U.S. Appl. No. 11/426,651.

Non-Final Office Action, Dec. 16, 2008, in U.S. Appl. No. 11/426,666.

Non-Final Office Action, Dec. 18, 2008, in U.S. Appl. No. 11/426,671.

Final Office Action, Apr. 23, 2009, in U.S. Appl. No. 11/426,675.

Final Office Action, Jun. 3, 2009, in U.S. Appl. No. 11/426,651.

Final Office Action, Jun. 15, 2009, in U.S. Appl. No. 11/426,648.

Non-Final Office Action, Aug. 13, 2009, in U.S. Appl. No. 11/426,675.

* cited by examiner

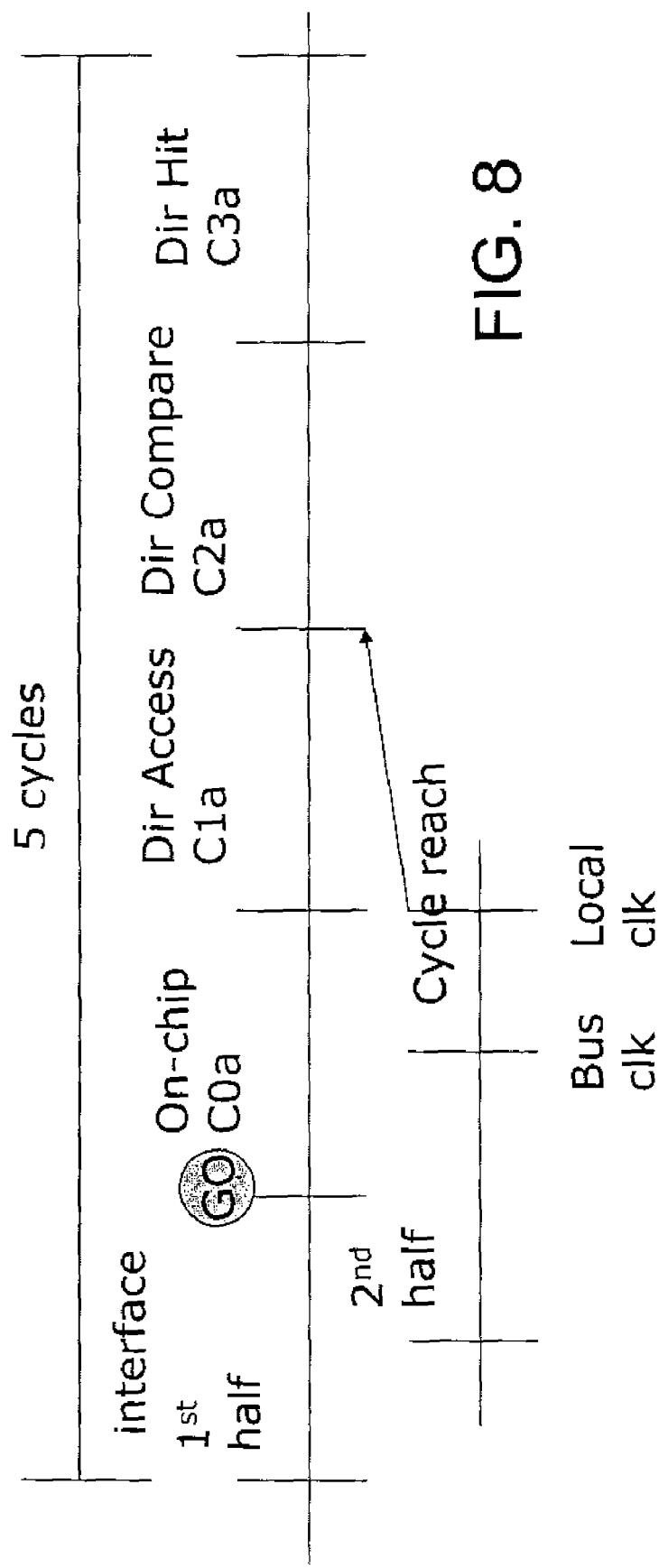

EARLY DIRECTORY ACCESS OF A DOUBLE DATA RATE ELASTIC INTERFACE

CROSS-REFERENCE TO RELATED APPLICATIONS

This application contains subject matter that is related to the subject matter of the following co-pending applications, each of which is assigned to the same assignee as this application, International Business Machines Corporation of Armonk, N.Y. Each of the below listed applications is hereby incorporated herein by reference in its entirety. Late Data Launch for a Double Data Rate Elastic Interface, now U.S. Pat. No. 7,752,475; Programmable Bus Driver Launch Delay/Cycle Delay to Reduce EI Elasticity Requirements, now U.S. Pat. No. 7,782,911. Mechanism for Windaging of a Double Rate Driver, now U.S. Pat. No. 7,734,944; Double Data Rate chaining on Elastic Interfaces, now U.S. Pat. No. 7,739,538.

FIELD OF THE INVENTION

This invention relates to a system and method for organizing and using data sent and received over a double data rate bus, and more particularly to an improved system and method to organize and use control data.

BACKGROUND OF THE INVENTION

In digital data systems in general and in computer systems in particular, there is an ever-increasing drive for larger bandwidth and higher performance. These systems are comprised of discreet integrated circuit chips that are interconnected by a bus. Data moves through a chip and between chips in response to clock pulses, which are intended to maintain synchronization of the data in parallel paths. At the extremely high data rates in today's systems, variations in the propagation of data over a bus along one path as compared to another path on the bus (i.e. skew) can exceed one clock cycle. U.S. Pat. No. 6,334,163, which is assigned to the assignee of this application and is incorporated herein by reference, discloses a so called Elastic Interface (EI) that can compensate for bus skew greater than one clock cycle without a performance penalty. However, packaging technology has not been able scale up to match the performance and bandwidth of the chip and interface technologies. In order to reduce the number I/O terminals on a chip and the number of conductive paths in a bus between chips, the prior art transfers data at a so called Double Data Rate (DDR), in which data is launched onto the bus at both the rising and falling edges of the clock. This allows the same amount of data to be transferred (i.e. bandwidth) with only half the number of bus conductors and half the number of I/O ports, as compared with a system where data is transferred only on a rising or a falling edge.

In certain control paths where the control data word is wider than the physical double data rate buss, the ability to transmit only a portion of the control data on one edge of the clock may introduce a latency of a half cycle while waiting for the remainder of the control data, which is transferred on the next clock edge. For example, in a control/address path from a CPU to an L2 cache, if only the first shot of address information can be sent on the first one half bus cycle, the full address takes another one half cycle to get to the destination. This extra latency in prior art organization and use of data in systems using double data rate interfaces introduces a latency that could degrade overall performance.

FIG. 1 illustrates a typical prior art interface between a central processor chip CP and a system controller chip SC for a set associative cache. In this illustrative example of the prior art, the bus is 40 bits wide and has a data rate of x, with data transferred on to the bus on one edge of the CP driver clock signal. FIG. 2 illustrates a prior art interface with the same data transfer rate as the interface of FIG. 1, but operating at a double data rate, that is with data transferred on both edges of the chip clock. Although the overall data rate is the same as in FIG. 1, here the bus is only 20 bits wide, but the data rate is 2×.

FIGS. 3 and 6 illustrate the number of local clock cycles required for a set associative cache access using the single data rate bus of FIG. 1. In this comparative illustration, 5 local clock cycles are used. The first clock cycle is used to latch the entire address data in the interface register C0. The second clock cycle determines on-chip priority arbitration (assumes more than one potential requester for directory access). The third clock cycle stores the address data in the address register (C1) and accesses the cache directory with the congruent segment of the cache address. The fourth local clock stores the directory (Dir) output in register Dir C2 and the cache data address in register Pipe (C2) and compares the address in the Compare Hit step. The fifth local clock cycle stores a directory hit data in register Pipe C3.

FIGS. 4 and 7 illustrates the prior art steps using a double data rate bus of FIG. 2. Here 5½ cycles are required because the first 20 bits sent over the interface are stored and wait one half cycle until the second 20 bits are transmitted, losing one half cycle of latency. The steps here are essentially the same as those explained in connection with FIGS. 3 and 6, except that the first 20-bits of the address are stored in a staging register Stg for one half cycle waiting for receipt of the second 20-bits of the address. At the end of the half cycle, the first 20-bits are transferred to the register Interface C0 where the second 20-bits are stored. From this point on the steps are as described in connection with FIGS. 3 and 6.

SUMMARY OF THE INVENTION

An object of this invention is the provision of a system and method to organize and use data sent over a double data rate interface so that the system operation does not experience a time penalty.

Briefly, this invention contemplates a system and method of organizing and using the first cycle of data independently of the second cycle so that latency is not jeopardized. There are many applications. In a preferred embodiment for an L2 cache, the system transmits congruence class data in the first half cycle and a 'fast-path' F etch bit to allow fast access to the L2 pipeline. If the fast access is requested, the operation can in most cases get prioritized for immediate execution (subject to contention with other resources) and can start to access the L2 cache directory with the congruence class data. Command/mode/tag information that is critical for a directory look-up arrives on the first half cycle, while the compare address and other tags can come on the next half cycle. This way, the directory look-up part of the critical path does not have to incur a penalty of waiting for the second half of the control data.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 8 illustrates the local clock cycles in the operation of a directory access in accordance with the teachings of the invention illustrated in FIG. 5.

DETAILED DESCRIPTION OF THE INVENTION

Figure 1:
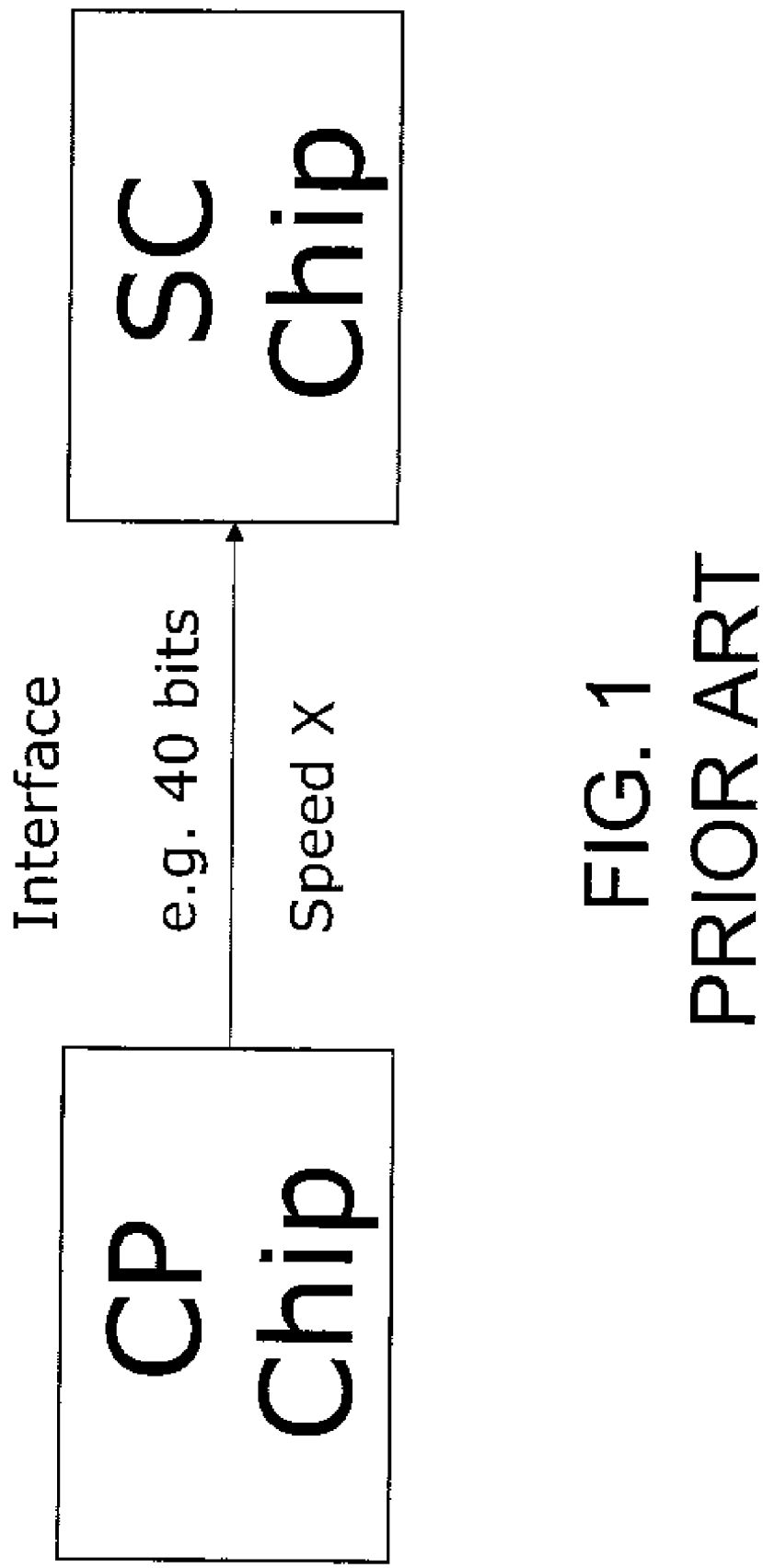
FIG. 1 is a simplified block diagram of a prior art elastic interface between two chips operating to transfer data on a single clock edge, that is, at a single data rate.
Figure 2:
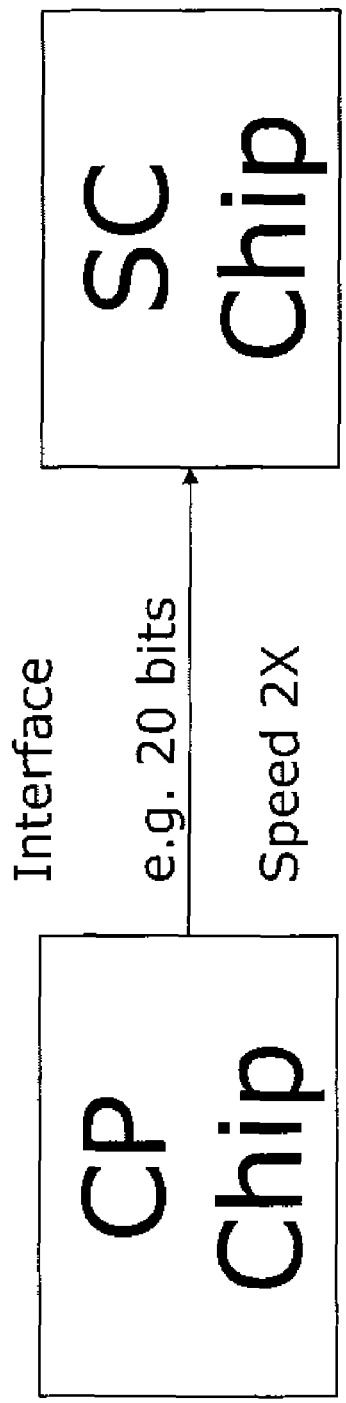
FIG. 2 is a block diagram similar to FIG. 1 illustrating a comparable double data rate bus.
Figure 3:
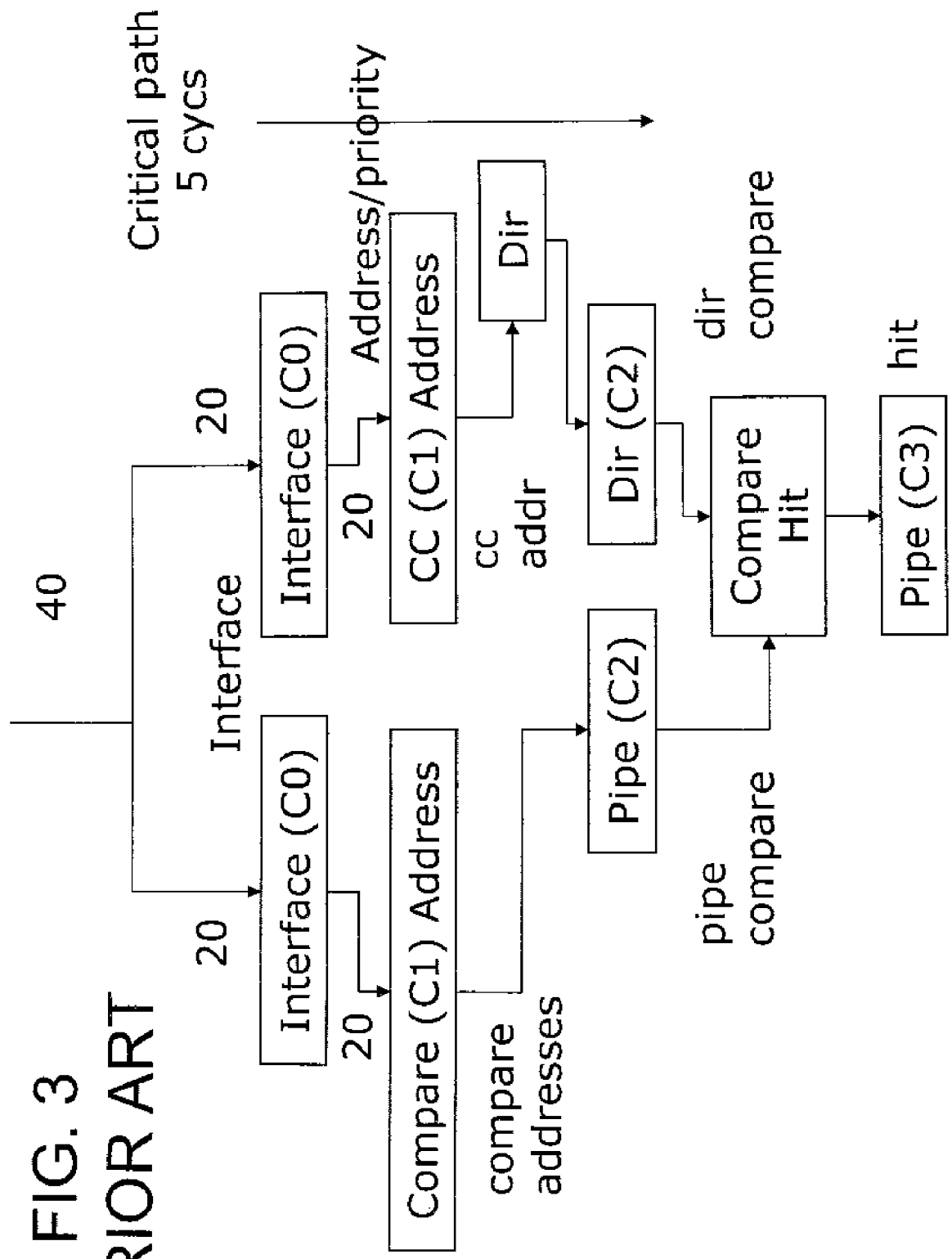
FIG. 3 is a block diagram showing the stages of a prior art directory access in which the directory address is received from a single data rate bus.
Figure 4:
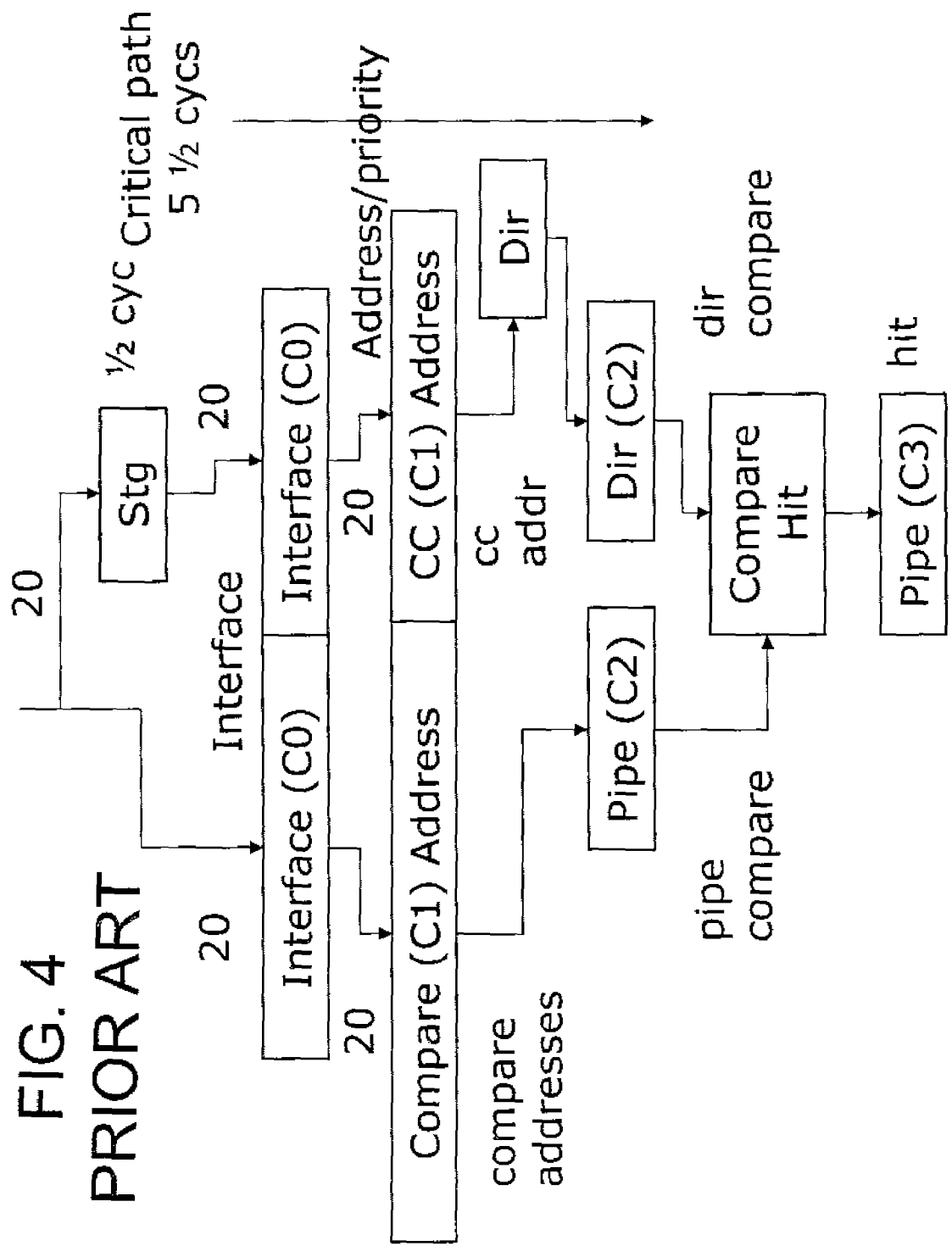
FIG. 4 is a block diagram similar to FIG. 3 showing the stages of a prior art directory access in which the directory address is received from a double data rate bus.
Figure 5:
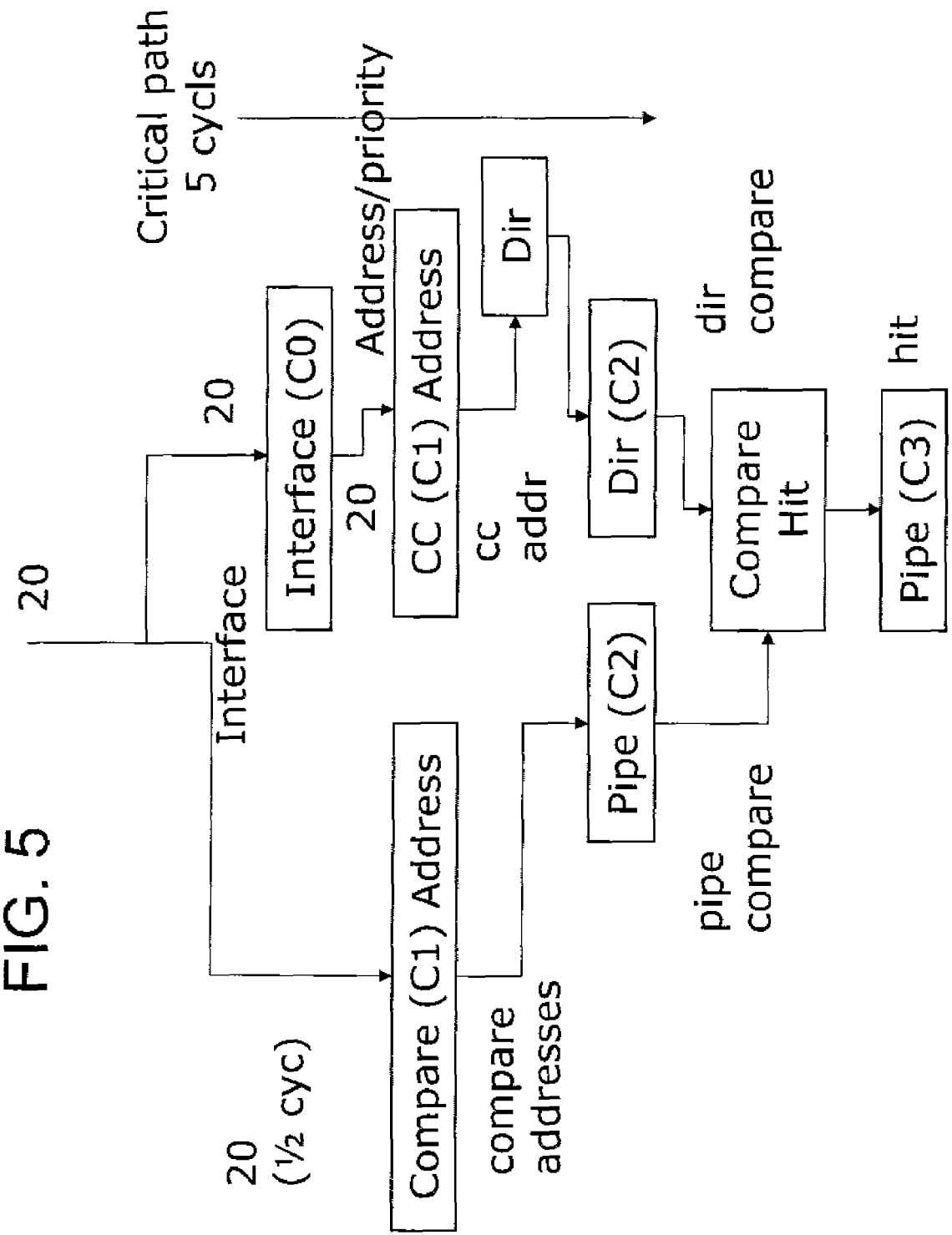
FIG. 5 is a block diagram similar to FIG. 4 showing the stages of a directory access in accordance with the teachings of this invention.
Figure 6:
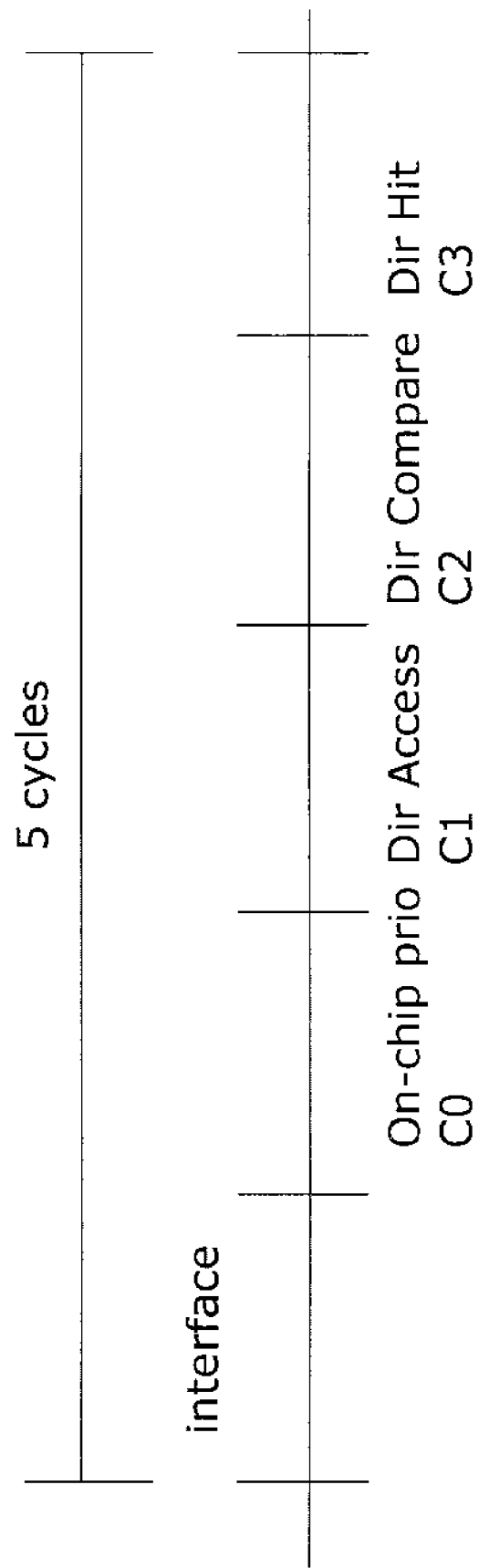
FIG. 6 illustrates the local clock cycles in the operation of the prior art directory access illustrated in FIG. 3.
Figure 7:
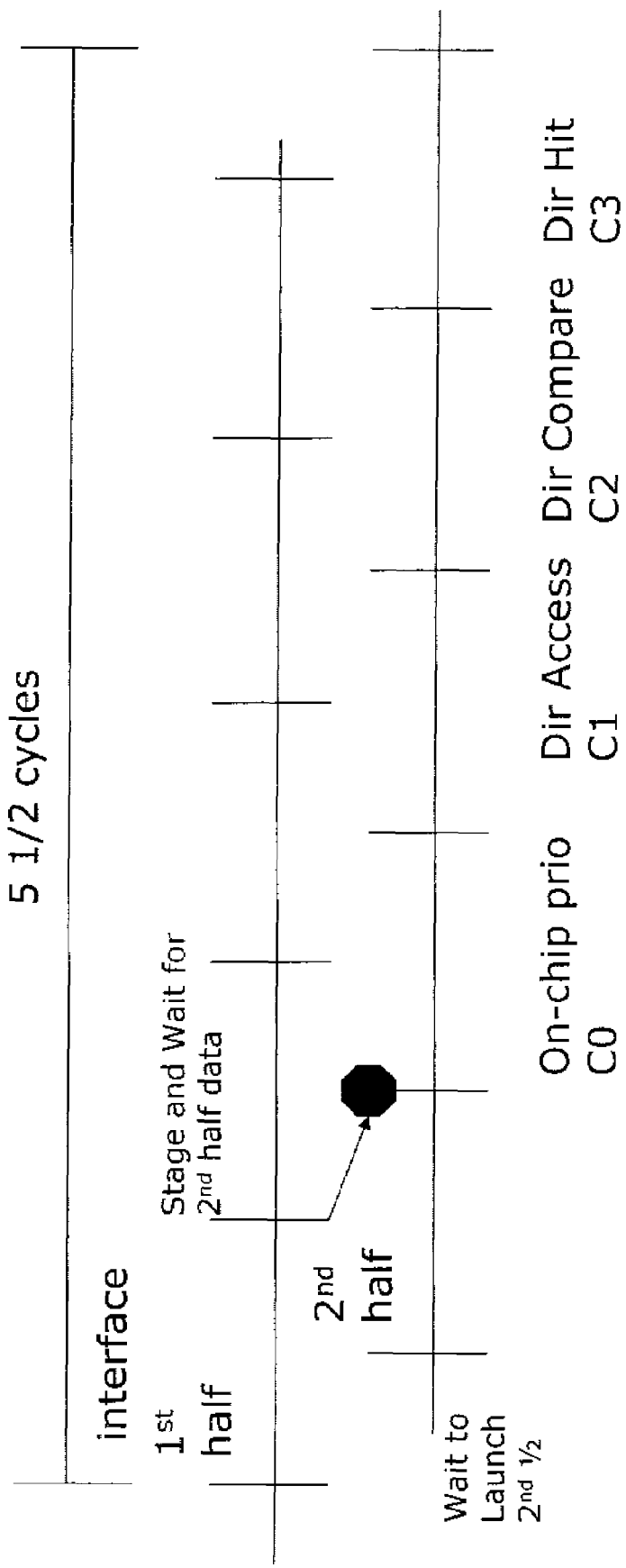
FIG. 7 illustrates the local clock cycles in the operation of the prior art directory access illustrated in FIG. 4.

Referring now to FIGS. 5 and 8 along with FIG. 2 of the drawings, in accordance with the teaching of this invention, in addressing an L2 cache over a double data rate bus with a 40-bit address as in the above prior art examples, on the first clock edge of the computer processor chip CP driver transmits 20-bits of the 40-bit address, as explained above in connection with FIG. 2. Included in this first 20-bits of the address, in accordance with the teachings of the invention, is the congruence class data necessary for a directory look up. Command and tag information necessary for a directory look-up may also be included in this first 20 bits of the address. As illustrated in FIG. 8, by the end of the first clock cycle the first transmitted 20 bits of the address, which includes the congruent address data, is latched in interface register C0. One half clock cycle later, the second half of the address is latched in compare address register C1. In the second clock cycle, on-chip priority arbitration takes place (assuming more than one potential requestor for directory access) based on the data in register C0. The data in interface register C0 is latched in directory address register C1, the directory Dir is addressed, and the addressed contents of the directory are latched in register Dir C2 in the third clock cycle. The second half of the address in register Compare C1 Address is latched in register Pipe C2 in the third clock cycle. The contents of the registers Pipe C2 and Dir C2 are compared in the fourth clock cycle, and, in the event of a hit, the directory data is latched in register Pipe C3 in the fifth clock cycle.

The second first half of the address data is stored in two registers on the system controller chip SC; register Stg1 and Stg2. The storage controller priority step starts at the beginning of the next clock cycle, even though the second half of the address is not latched into the address interface register C0 until one half clock cycle later. The first half of the address data stored in register Stg 1 is latched into the address interface register C0 on the edge of this half clock cycle along with the second half of the address. The cache directory Dir input in accordance with the invention includes a multiplexer MUX with two select inputs, FAST and NORMAL. The fast bit stored in register Stg 2 activates the FAST select input. When the FAST input is activated, the MUX couples the congruence class data (i.e. command/mode/tag information required for a directory look-up) stored in register Stg 2 to the input of the cache directory DIR. The directory access extends over one clock cycle C1$a$ starting at the end of the priority cycle C0a. If there is a hit in the cache directory, the data is transferred from the directory Dir to the directory register Dir C2 during this directory access clock cycle C1$a$. The fill address in register C0 is transferred to register Pipe C1 in clock cycle C0$b$ and to register Pipe C2 in clock cycle C1$b$. The directory compare step extends over clock cycle C2$a$ where the content of the directory register Dir C2 is compared to the content of the address register Pipe C2. If there is a hit, the contents of the directory register Dir C2 are outputted in clock cycle C3$a$. Here it should be noted that the NORMAL select input to the multiplixer MUX the multiplexer couples the input of register Pipe C1 to the input of the cache directory Dir.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method to address a cache memory with a control data word that is transmitted from a processor unit to the cache memory over a double data rate bus in which a first group of bits that comprises one portion of the control data word is transmitted in response to an edge of a bus clock signal and a second group of bits that comprises another portion of the control data word is transmitted in response to a next following edge of the bus clock signal, the method comprising:

transmitting the first group of bits comprising congruent class data for a cache address directory memory look up;

latching the first group of bits in an interface register by an end of a first local clock cycle;

latching the second group of bits in a compare address register during the first local clock cycle;

arbitrating priority based on the first group of bits in the interface register starting in a beginning of a next second local clock cycle;

latching the first group of bits latched in the interface register in a directory address register, addressing the directory, and latching the addressed content of the directory in a directory register in a next third local clock cycle;

latching the second group of bits latched in the compare address register in a compare pipe register in the third local clock cycle; and comparing the content of the directory register with the second group of bits in the compare pipe register in a next fourth local clock cycle.

2. The method of claim 1, further comprising:
latching the content of the directory register in a hit register in a next fifth local clock cycle if there is a hit in response to comparing the content of the directory register.

3. The method of claim 1, wherein the first group of bits include command and tag information.

4. The method of claim 2, wherein the first of group bits include command and tag information.

5. A method to address a cache memory with a control data word that is transmitted from a processor unit to the cache memory over a double data rate bus in which a first group of bits that comprises a portion of the control data word is transmitted in response to a first edge of a bus clock signal and a second group of bits that comprises a portion of the control data word is transmitted in response to a next following edge of the bus clock signal, the method comprising:

transmitting the first group of bits comprising congruent class data for a cache address directory memory look up;

latching the first group of bits in one register in a first local clock cycle; latching the second group of bits in another register in the first local clock cycle;

accessing a directory of the cache memory based on the first group of bits latched in the one register commencing with a start of a next second local clock cycle.

6. The method of claim 5, wherein the accessing includes latching the first group of bits latched in the one register in a directory address register, addressing the directory, and latching the addressed content of the directory in a register in a next third local clock cycle.

7. The method of claim 6, further comprising:
comparing the addressed content of the directory with the second group of bits in a next fourth local clock cycle.

8. The method of claim 7, further comprising:
latching the content of the directory in a register in a next fifth local clock cycle if there is a hit in response to comparing the content of the directory register.

9. The method of claim 5, wherein the first group of bits includes command and tag information.

10. The method of claim 6, wherein the first group of bits includes command and tag information.

11. The method of claim 7, wherein the first group of bits includes command and tag information.

12. The method of claim 8, wherein the first group of bits includes command and tag information.

13. A processor chip and a cache memory control chip coupled together via a double data rate bus to address a cache memory with a control data word that is transmitted from the processor chip to the cache memory control chip over the double data rate bus in which a first group of bits that comprises one portion of the control data word is transmitted in response to an edge of a bus clock signal and a second group of bits that comprises another portion of the control data word is transmitted in response to a next following edge of the bus clock signal including: an interface register for latching the first group of bits by the end of a first cache memory control chip local clock cycle, the first group of bits including congruent class data for a cache address directory memory look up and, starting in a beginning of a next second local clock cycle, arbitrating priority based on the first group of bits in the interface register;

a compare address register for latching the second group of bits during the first cache memory control chip local clock cycle;

a directory address register for latching the first group of bits latched in interface register in a next third local clock cycle, and addressing the address directory, and latching the addressed content of the address directory in a directory register in a the next third local clock cycle.

14. The processor chip and the cache memory control chip of claim 13, further including:

a compare pipe register for latching the second group of bits latched in the compare address register in the third local clock cycle.

15. The processor chip and the cache memory control chip of claim 14, further including:

a comparator for comparing the content in the directory register with the second group of bits in the compare pipe register in a next fourth local clock cycle.

16. The processor chip and the cache memory control chip of claim 15, further including:

a hit register for latching the content of the address directory in the directory register in the hit register in a next fifth local clock cycle when there is a hit.

17. The processor chip and the cache memory control chip of claim 13, wherein the first group of bits includes command information.

18. The processor chip and the cache memory control chip of claim 13, wherein the first group of bits includes tag information.

19. The processor chip and the cache memory control chip of claim 13, wherein the first group of bits includes command and tag information.

20. The processor chip and the cache memory control chip of claim 14, wherein the first group of bits includes command and tag information.

* * * * *